Sept. 15, 1931.      O. L. HERRON      1,823,541
TRIM MOLDING
Filed Aug. 31, 1929
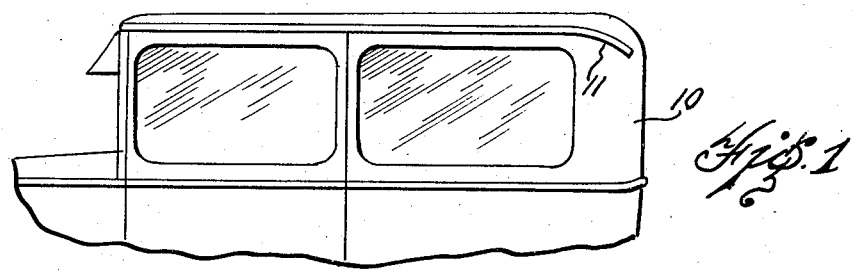
Fig. 1
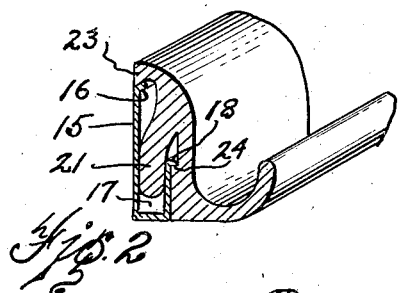
Fig. 2
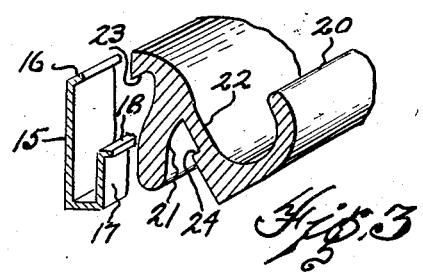
Fig. 3
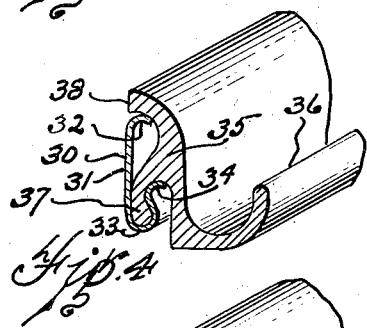
Fig. 4
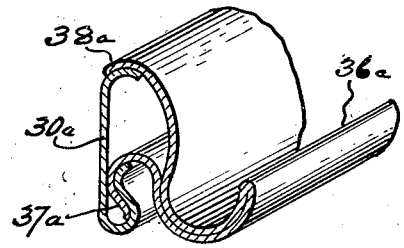
Fig. 7
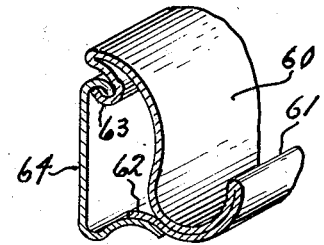
Fig. 8
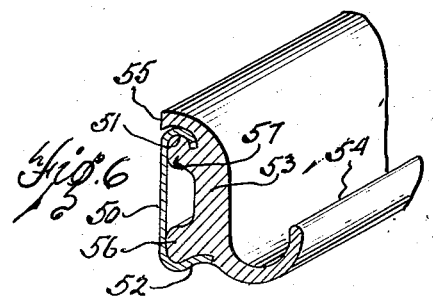
Fig. 6
INVENTOR.
Ollie L. Herron
BY
Francis D Hardesty
ATTORNEY.

Patented Sept. 15, 1931

1,823,541

UNITED STATES PATENT OFFICE

OLLIE L. HERRON, OF CHICAGO, ILLINOIS, ASSIGNOR, BY MESNE ASSIGNMENTS, OF THIRTY ONE-HUNDREDTHS TO WILMA M. ZIMMERS, THIRTY ONE-HUNDREDTHS TO ANNA L. HERRON, TWENTY ONE-HUNDREDTHS TO JOSEPH B. ZIMMERS, AND TWENTY ONE-HUNDREDTHS TO OLLIE L. HERRON, ALL OF CHICAGO, ILLINOIS

TRIM MOLDING

Application filed August 31, 1929. Serial No. 389,764.

The present invention relates to trim moldings for use especially on vehicle bodies, and more particularly to a two part molding in which one part is designed to be nailed or otherwise secured to the vehicle body and the other portion attached thereto, to provide means for covering up the more or less unsightly nailing portion and the nails or screws by means of which it may be attached.

Among the objects of the invention is a molding in which the finishing strip may be more readily applied than in the forms heretofore known and used.

Another object is a two-part molding which may be formed either of extruded metal or of sheet metal utilizing substantially the same principles in each.

Still other objects will readily occur to those skilled in the art upon reference to the following description and the accompanying drawings in which Fig. 1 is a side elevation of a portion of a vehicle body indicating the use of the present device.

Fig. 2 is a perspective view with part in section of one form of the two part molding with the parts fixed together.

Fig. 3 is a similar view of the molding of Fig. 2 but with the parts before fixing them together.

Figs. 4, 5, and 6 are views similar to that of Fig. 2 but each showing a slightly modified form of the molding with the finishing strip indicated as being of extruded metal.

Figs. 7 and 8 are views similar to Fig. 2 but showing the finishing strip as made of sheet metal.

In the drawings a vehicle body is indicated at 10 and shows at 11 a finishing strip preferably forming also a drip molding and indicating the use of the molding illustrated in the other figures.

While in each instance in Figs. 2 to 8, a drip molding comprising a drip trough has been shown, it should be understood that the molding may be formed without the drip trough if this should be at any time considered desirable.

Referring now to Figs. 2 and 3, the nailing strip is indicated at 15 as consisting of a substantially flat wall portion, having along its upper edge an outwardly extending and inclined flange 16, and having its lower edge turned outwardly and upwardly to form a pocket as indicated at 17. The upper edge of the pocket 17 is likewise provided with an out-turned flange 18.

The finishing strip for this form of molding comprises a trough portion 20, a body portion 21, to which the trough portion is attached by means of a comparatively thin "hinge" portion 22. The body portion 21 extends downwardly a short distance below the point of attachment of the hinge portion 22 and extends upwardly and is bent over at its top to provide a hook portion 23. In addition the trough portion 20 is provided with a shoulder 24 on the side adjacent the body portion for a purpose to be described.

In applying the form of molding just described, the nailing strip 15 will, of course, be secured in position upon the vehicle body or other support, whereupon the body portion 21 of the finishing strip will be placed in the pocket 17 and the hook 23 placed over the inclined flange 16. When this has been done, the trough portion will be bent down about the hinge portion 22 so that the shoulder 24 rests under the flange 18. As the finishing strip is preferably made of extruded metal and is, therefore, somewhat flexible and substantially non-resilient, after the strip has been placed in position as described, it remains firmly fixed and provides a desirable finish.

In Fig. 4 is shown a modification of the forms of molding just described and in this form the nailing strip is shown at 30 and is made of more or less resilient metal such as sheet steel and consists of the flat wall portion 31 having its upper edge turned over and outwardly to form a flange 32. The lower edge of the strip is turned upwardly and outwardly to form a pocket portion 33 having an outwardly extending flange 34. The finishing strip comprises a body portion 35 provided, if desired, with a trough portion 36, and having a rib 37 along its inner face about midway of the strip and extending downwardly. The upper edge 38 of the finishing strip is bent over so as to rest upon the flange 32 when the parts are secured together. In this form it is preferred to make the outer edge of the rib 37 somewhat thicker than the rest of the rib and to form the pocket 33 so that the flanged edge will tend to spring back against the wall portion 31. With this formation, when the downwardly extending rib 37 is thrust into the pocket, the strip 30 holds the finishing molding securely in place.

In Fig. 7 substantially the same form of two-part molding is shown but in this figure the finishing strip is shown as formed of a strip of sheet metal such as steel, bent back upon itself substantially along its middle line and this portion of the strip curved upwardly to form a drip trough 36a. The two edges of the strip are then formed so that one edge 38a corresponds to the edge 38 in the form shown in Fig. 4, while the other edge 37a corresponds in form and function to the rib 37. The nailing strip 30a is substantially identical with the nailing strip 30.

In Fig. 5 is shown a two part molding which is closely analagous to that shown in Fig. 4 but which the various parts have slightly different shapes. In Fig. 5 the nailing strip 40 is provided with an inclined flange 41 along its upper edge and a pocket 42 at its lower edge formed by turning up the lower edge of the strip and at its upper edge the pocket is provided with a short inclined flange 43 extending inwardly of the pocket. The finishing strip has a drip trough 44 at its lower edge and an intermediate rib 45 which is provided on its under side with the recess 46 into which extends the outer wall of pocket 42 and its flange 43, the recess also being inclined so that the inclined flange 43 tends to prevent upward movement of the finishing strip when placed in position.

The upper edge of the finishing strip is provided with a hook portion 47 corresponding in form and function to the hook portion 23 of the form shown in Fig. 2.

In Fig. 6 is shown still another form of the finishing molding and in this figure the nailing strip is shown at 50 and as having its upper edge curved to form a recess 51 and as having its lower edge turned upwardly and outwardly as at 52 to form a second recess but of less depth than the first one. The finishing strip comprises a body portion 53 having one of its edges forming a drip trough 54 and its other edge curved over as at 55 to extend over the upper part of the nailing strip. Between the drip trough and the portion 55 the strip is provided with two ribs 56 and 57, the former of which fits in the pocket formed by the lower edge 52 while the rib 37 is designed to fit in the recess 51 under the turned over upper edge. It is preferred to form the pocket at the lower edge of the nailing strip of small depth so that the spring quality of the metal of the edge 52 may be utilized in fixing the parts together. In this operation the rib 57 is first placed in the recess 51 and then the rib 56 forced over the edge 52 into the pocket.

In Fig. 8 is shown a form of the molding which corresponds closely to that shown in Fig. 6 but in which the finishing strip is formed of sheet metal. In this figure a strip of metal 60 has one edge bent back upon itself and the doubled portion bent upwardly as at 61 to form the drip trough. The edge of the strip is then curved away from the body of the strip to provide a rib portion 62 corresponding in function to the rib 56 of Fig. 6. The other edge of the strip 60 is bent back upon itself and the extreme edge bent outwardly and upwardly to form a hook portion, or portion which corresponds closely in function to the rib 57. In this form of the device the nailing strip 64 will be substantially the same as the strip 50 in Fig. 6.

All of the present forms of finishing molding with the exception of that shown in Figs. 2 and 3, may be considered as "snap on" moldings, that is, they utilize the resilience of one of the members in order to fix them firmly in position.

Now having described the invention and the preferred forms of embodiment thereof, it is to be understood that the said invention is to be limited, not to the specific details herein described and illustrated, but only by the scope of the claims which follow.

I claim:—

1. A molding including a sheet metal nailing strip having an outturned top flange and a pocket formed by bending its bottom edge outwardly and upwardly, and a finishing strip having a portion lying on top of and behind said outturned top flange to hide it, a portion entering the nailing strip pocket, and a third portion spaced from said pocket entering portion but more or less parallel thereto and concealing that portion of the nailing strip which forms the front wall of the pocket.

2. A molding including a sheet metal nailing strip having an outturned top edge and a pocket formed by bending its bottom edge outwardly and upwardly, and a finishing strip having a portion lying on top of said outturned top edge to hide it, a portion entering the nailing strip pocket, and a third portion spaced from said pocket entering portion but more or less parallel thereto and concealing that portion of the nailing strip which forms the front wall of the pocket, the pocket forming edge of the nailing strip having a deformed portion adapted to interlockingly engage the finishing strip to prevent upward displacement thereof.

OLLIE L. HERRON.